US006738675B2

(12) United States Patent
Dai

(10) Patent No.: US 6,738,675 B2
(45) Date of Patent: May 18, 2004

(54) METHOD, APPARATUS, AND SYSTEM TO REDUCE MICROPROCESSOR POWER DISSIPATION

(75) Inventor: Xia Dai, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 440 days.

(21) Appl. No.: 09/751,727

(22) Filed: Dec. 30, 2000

(65) Prior Publication Data

US 2002/0087219 A1 Jul. 4, 2002

(51) Int. Cl.[7] .............................................. G05B 11/01
(52) U.S. Cl. .......................... 700/22; 700/21; 700/39; 700/79; 713/300; 713/322; 713/390; 713/400
(58) Field of Search .................... 700/39, 21, 22, 700/79, 80, 81, 82, 13; 713/300, 310, 320, 321, 322, 338, 340, 400, 500, 600; 714/814–815

(56) References Cited

U.S. PATENT DOCUMENTS

| | | | |
|---|---|---|---|
| 5,021,679 A | | 6/1991 | Fairbanks et al. |
| 5,153,535 A | | 10/1992 | Fairbanks et al. |
| 5,307,003 A | | 4/1994 | Fairbanks et al. |
| 5,513,358 A | * | 4/1996 | Lundberg et al. ........... 713/330 |
| 5,625,806 A | | 4/1997 | Kromer |
| 5,627,412 A | | 5/1997 | Beard |
| 5,752,011 A | | 5/1998 | Thomas et al. |
| 5,813,022 A | | 9/1998 | Ramsey et al. |
| 5,963,023 A | * | 10/1999 | Herrell et al. .............. 323/265 |
| 5,974,557 A | | 10/1999 | Thomas et al. |
| 6,108,226 A | * | 8/2000 | Ghosh et al. ............... 363/142 |
| 6,141,765 A | * | 10/2000 | Sherman ..................... 713/400 |
| 6,216,235 B1 | | 4/2001 | Thomas et al. |
| 6,298,105 B1 | * | 10/2001 | Dai et al. .................... 375/371 |
| 6,347,379 B1 | * | 2/2002 | Dai et al. .................... 713/320 |
| 6,351,150 B1 | * | 2/2002 | Krishnamurthy et al. ...... 326/98 |
| 6,487,668 B2 | | 11/2002 | Thomas et al. |

OTHER PUBLICATIONS

U.S. patent application Ser. No. 09/204,896 filed Dec. 3, 1998.
U.S. patent application Ser. No. 09/677,263 filed Sep. 30, 2000.
U.S. patent application Ser. No. 09/677,261 filed Sep. 30, 2000.
Intel Corporation, "IA–32 Processors and Related Products Databook"; Chapter 1; pp. 1–11—1–20; Mar. 1999.
Intel Corporation, "IA–32 Processors and Related Products Databook", Appendix A; pp. 1–53—1–69; Mar. 1999.
Intel Corporation, "IA–32 Processors and Related Products Databook"; Chapter 7; pp. 7–161—7–224; Mar. 1999.
Intel Corporation, "Intel Architecture Software Developer's Manual; vol. 1: Basic Architecture"; Chapter 2; pp. 2–1—2–14; 1999.

* cited by examiner

*Primary Examiner*—Ramesh Patel
(74) *Attorney, Agent, or Firm*—Blakely, Sokoloff, Taylor & Zafman LLP

(57) ABSTRACT

A method and apparatus for reducing a microprocessor's power dissipation. In one embodiment a microprocessor includes a clock circuit, a core coupled to said clock circuit, and an on-die logic circuit coupled to said clock circuit to operate independent of a connection for power to said core, the on-die logic circuit includes a snoop request monitor coupled to a bus, and a snooping memory circuit.

23 Claims, 5 Drawing Sheets

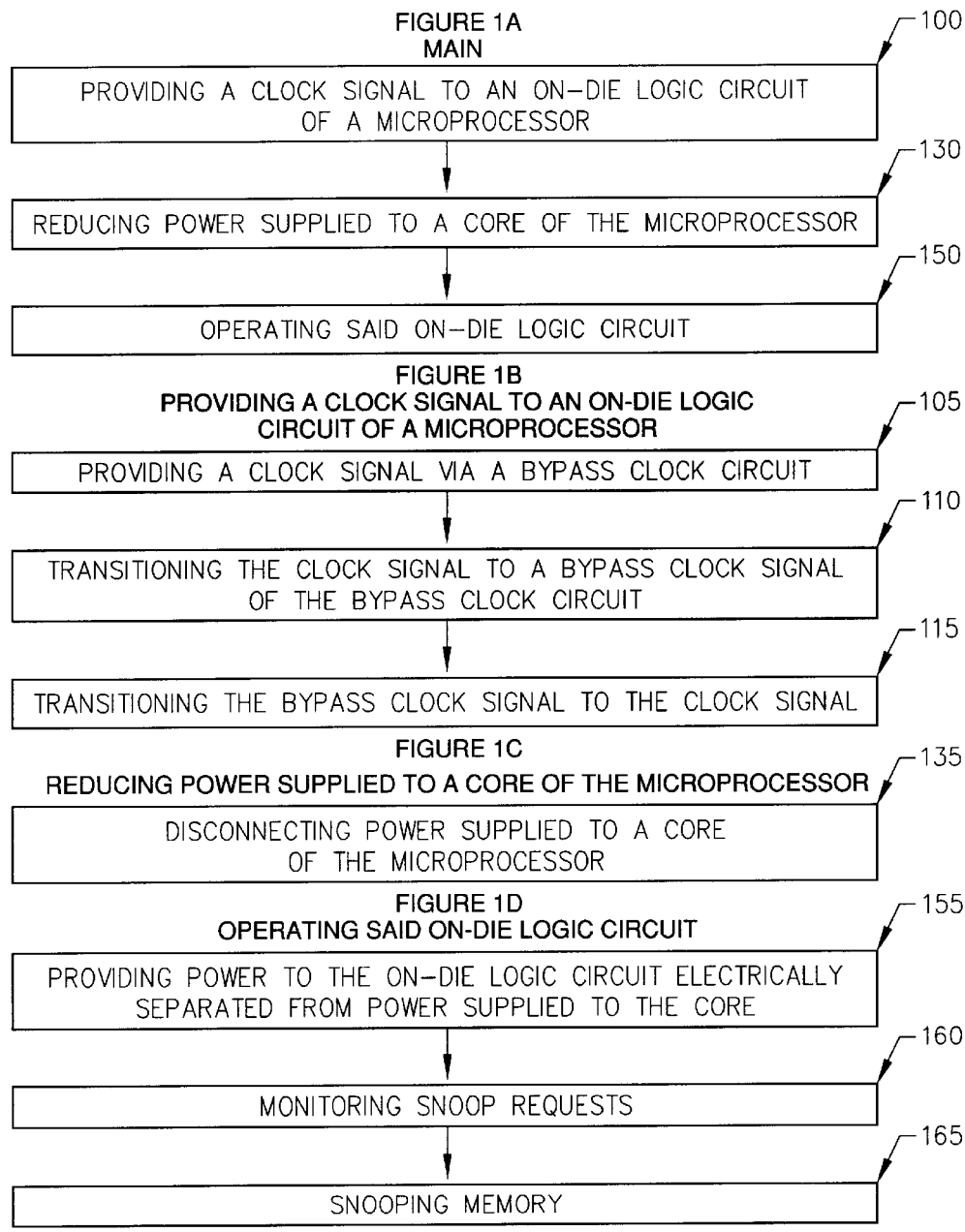

Figure 2C:
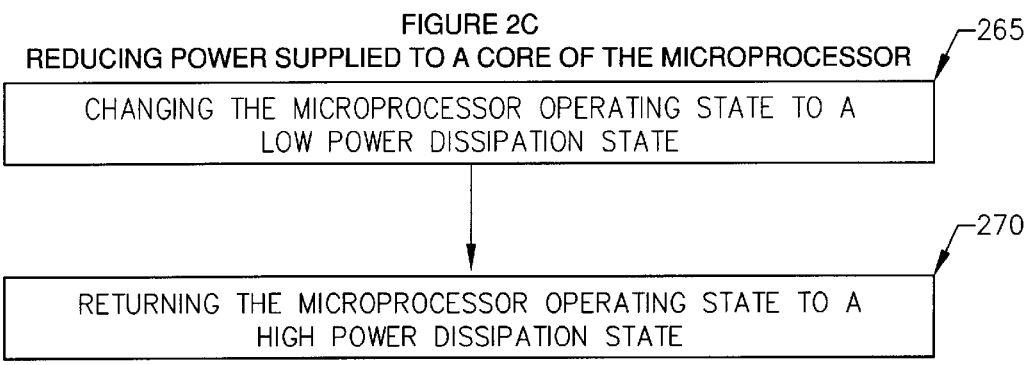
Figure 2D:
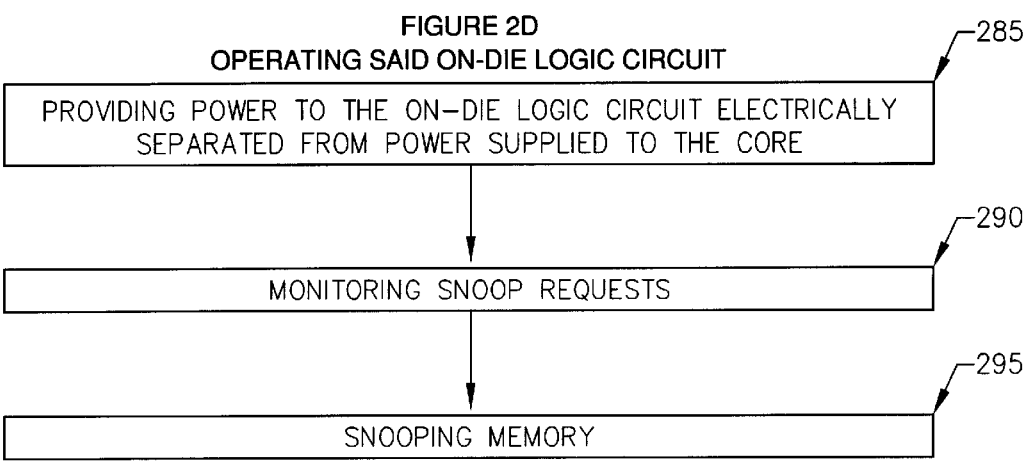

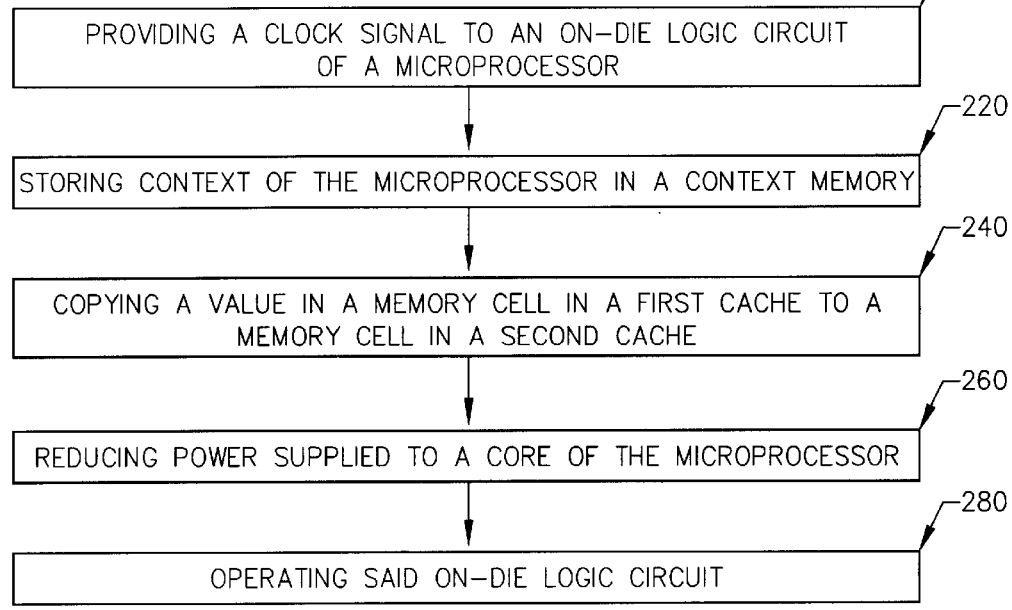
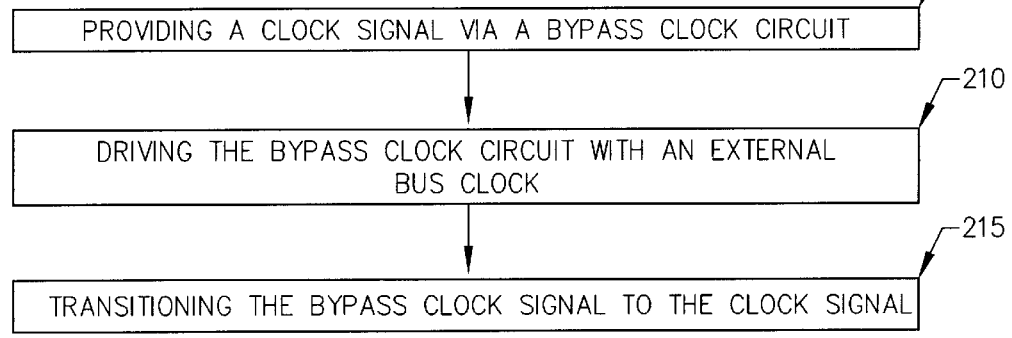

REDUCING POWER SUPPLIED TO A CORE OF THE MICROPROCESSOR

OPERATING SAID ON-DIE LOGIC CIRCUIT

METHOD, APPARATUS, AND SYSTEM TO REDUCE MICROPROCESSOR POWER DISSIPATION

FIELD OF INVENTION

The present invention is in the field of reducing microprocessor power dissipation. More particularly, the present invention comprises a method, apparatus, and system to reduce core leakage power of a microprocessor.

BACKGROUND

An important design factor for portable devices is power dissipation. A personal digital assistant or a notebook computer, for example, operating on battery power, can only last as long as its battery. As such, designers of both microprocessors for portable devices and portable microprocessor-operated devices, look for ways to reduce power dissipation.

One way to reduce power dissipation in microprocessor-operated devices is to determine where power is wasted. Microprocessors connected to a power supply have a core leakage power. Core leakage power is getting worse for each microprocessor generation. Core leakage power is wasted power, typically in the form of heat, and it increases as a percentage of total microprocessor power. In a 0.81 micron process, a Pentium III microprocessor, for example, can leak as much as six watts, contributing 30% of the total microprocessor power. Thus, the more complex the microprocessor becomes, the greater its core leakage power. In fact, additional power is sometimes used to remove heat from a microprocessor-operated device to prevent the microprocessor from overheating.

As a way of reducing power dissipation, microprocessors are typically designed to switch between different operating states. In particular, a portable microprocessor-operated device may repeatedly change from a high power dissipation state to a low power dissipation state. Any operating state for a microprocessor that requires nominal operating voltage and a nominal operating frequency in the microprocessor core is a high power dissipation state. A low power dissipation state is any operating state of the microprocessor where the operating voltage or operating frequency of the microprocessor can be reduced below nominal values. A microprocessor can be placed in a low power dissipation state when the microprocessor is not being asked to perform a function that requires action by the microprocessor's core. For example, when a person requests a computer to calculate a number or a series of numbers, the microprocessor's core is probably being used and the microprocessor remains in a high power dissipation state. On the other hand, when the computer completes the calculation and displays the answer on the screen, the microprocessor's core may do nothing while the user reviews the answer. When the microprocessor's core is not required to perform an action, the microprocessor can change to a low power dissipation state.

Several important factors are involved in designing a microprocessor to enter a low power dissipation state. First, the microprocessor designer will determine or assume the types of functions regularly required of the microprocessor's core. Even when the user is not requesting calculations to be performed, the microprocessor operated device may require some functions to be performed. For devices that have memory, one function that may need to be performed is snooping. Data placed in memory may be stored in more than one memory location to improve data access speed and snooping refers to a function performed by a microprocessor to maintain coherency for the same copy of data stored in multiple locations, e.g. dynamic random access memory (DRAM), level two cache, and level one cache.

Second, the latency involved in changing from the high power dissipation state to the low power dissipation state can be considered. A calculator, for example, that takes longer to change from the low power dissipation state to the high power dissipation state than it takes the user to sum two numbers, can lose its usefulness for summing two numbers if the calculator enters the low power dissipation state each time the user looks up a number. Designers, therefore, balance the inconvenience of latency to change operating states against the inconvenience of running out of battery power.

Third, the reduction of power dissipation gained by entering a low power dissipation state can be considered. Multiple low power dissipation states are possible with varying latencies, so the design can balance the different low power dissipation states available against the latency involved with transitioning to each low power dissipation state.

Several problems arise when attempting to balance these factors. One problem is the requirement to remain in a high power dissipation state to snoop memory since it maintains the core leakage power at a high level. A second problem is that a core leakage power increasing as a percentage of total microprocessor power, limits the performance of microprocessors in portable microprocessor-operated devices. In particular, while total microprocessor power increases at a faster pace than battery power technology, either the size of the battery for portable microprocessor-operated devices will become larger to allow the same usage time or the usage time will become shorter, creating a significant drop in performance for portable devices as compared to devices that operate on external power sources. In either case, the portable microprocessor-operated device becomes less desirable. Additionally, high latency involved in changing to low power dissipation states limits the ability to operate microprocessors in the low power dissipation states.

BRIEF FIGURE DESCRIPTIONS

The accompanying drawings, in which like references indicate similar elements, show:

FIGS. 1a–d Flow chart of the present invention.

FIGS. 2a–d Alternative flow chart of the present invention.

Figure 3:
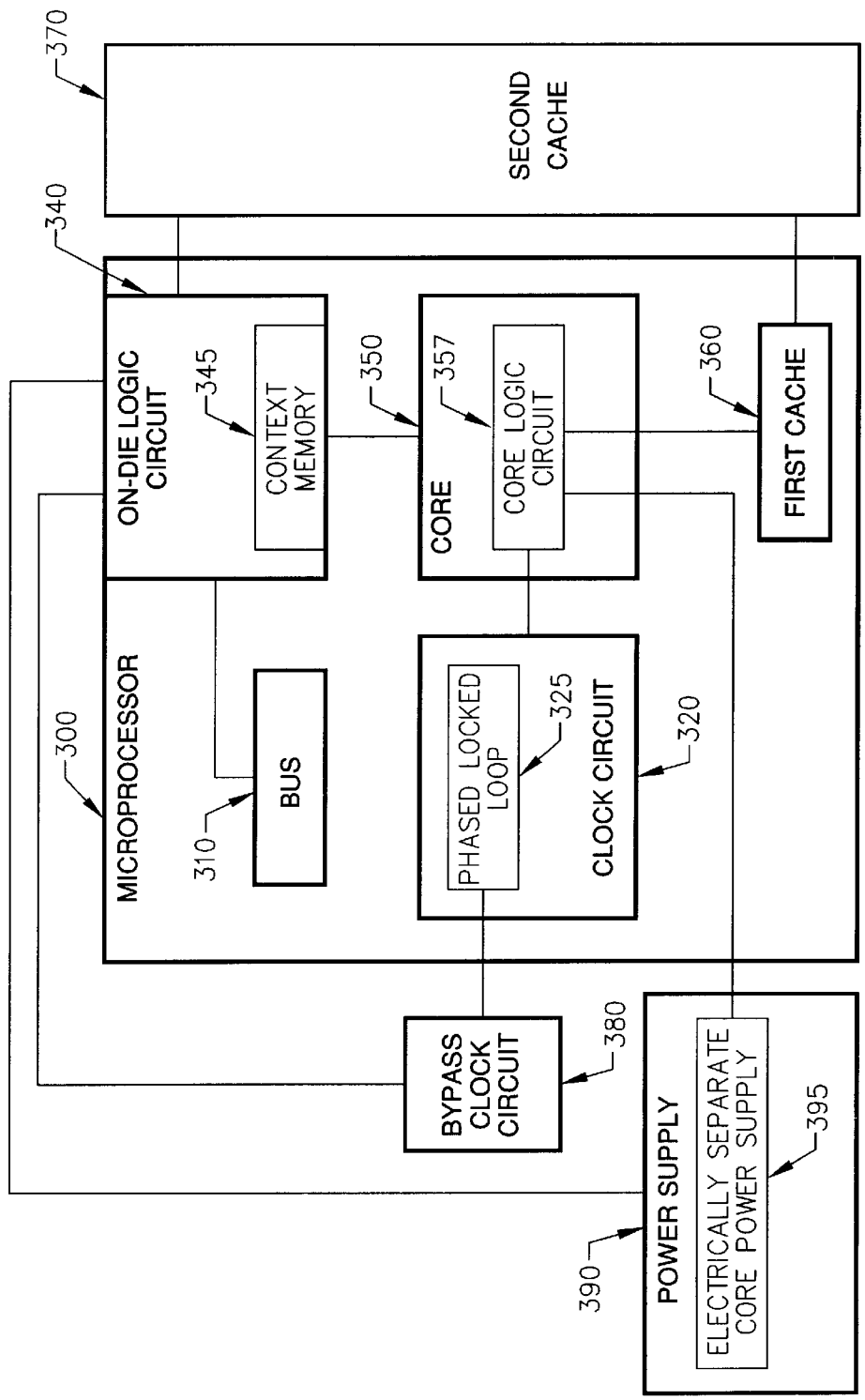
Figure 4:
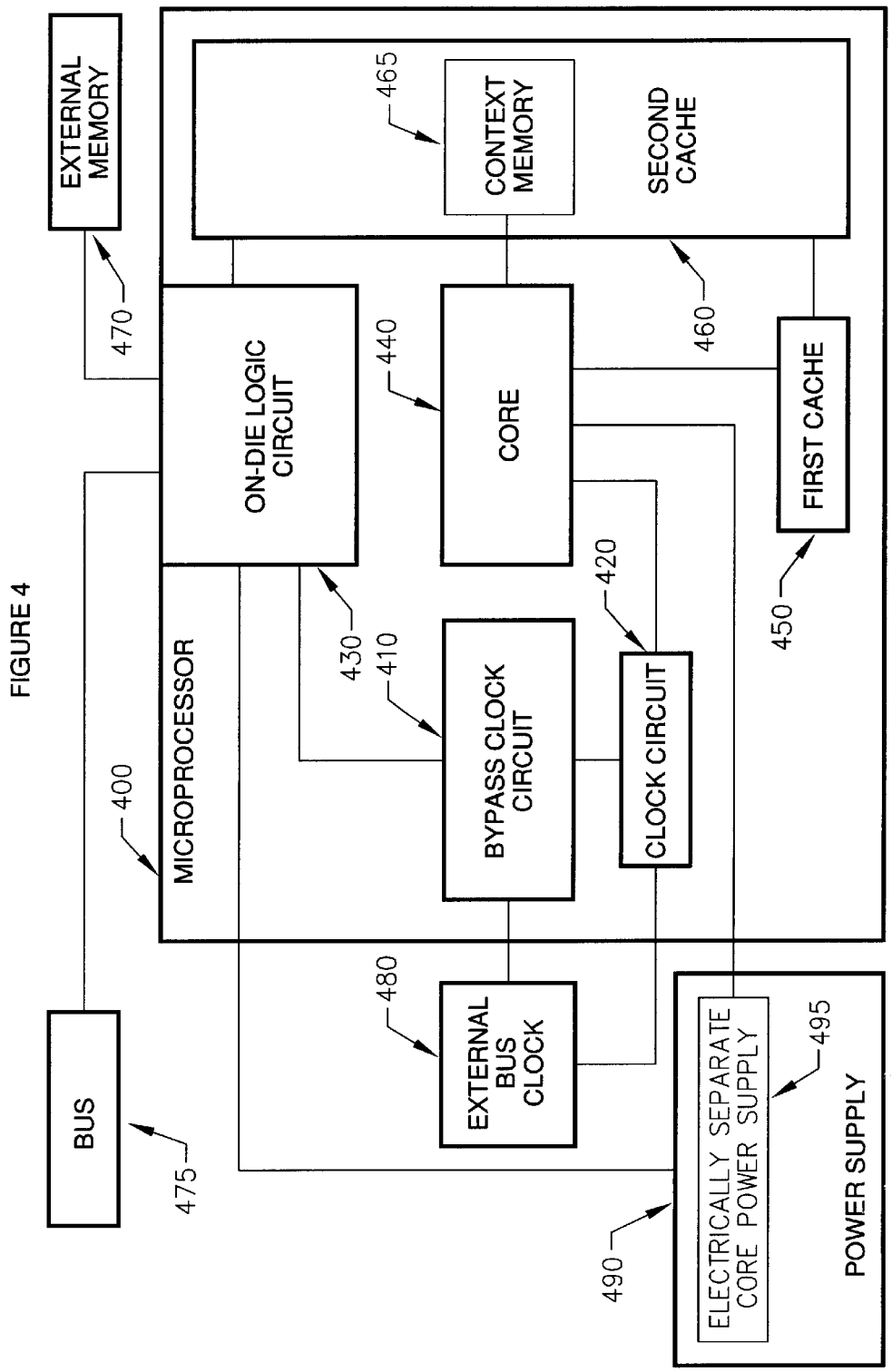

FIGS. 3–4 Example apparatus embodiments of the present invention.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments. The variations of embodiments anticipated for the present invention are too numerous to discuss individually so the detailed descriptions below are designed to make such embodiments obvious to a person of ordinary skill in the art.

In particular, the following describes method, apparatus, and system embodiments to reduce microprocessor power dissipation. Referring to FIGS. 1a–d, an example flow chart is shown. The method comprises providing a clock signal to an on die logic circuit of a microprocessor 100, reducing power supplied to a core of the microprocessor 130, and operating said on-die logic circuit 150. Providing a clock signal to an on-die logic circuit of a microprocessor 100, in the present embodiment, entails providing a clock signal via a bypass clock circuit 105, transitioning the clock signal to a bypass clock signal of the bypass clock circuit 110, and transitioning the bypass clock signal to the clock signal 115. The bypass clock circuit, in the present embodiment provides the on-die logic circuit with a core frequency. The core frequency can be determined as a ratio, approximately five to one, of the external bus clock and the external bus clock operates at the external bus frequency designed for this microprocessor-operated device, which can be approximately 200 MHz. So the core frequency, in the present embodiment, operates at close to 1 GHz. Then, transitioning the clock signal to a bypass clock signal of the bypass clock circuit 110 changes the clock signal used to operate the on-die logic circuit to the bypass clock signal, a second clock frequency designed to operate the on-die logic circuit when reducing power supplied to a core of the microprocessor 130. The bypass clock circuit can use an on-die delay locked loop circuitry to generate the bypass clock signal, in a manner well known to those of skill in the art. The microprocessor can return to a high power dissipation state by transitioning the bypass clock signal to the clock signal 115.

Referring now to FIGS. 1*a* and *c*, a detailed flow chart for reducing power supplied to a core of the microprocessor 130 for this example embodiment is shown. Reducing power supplied to a core of the microprocessor 130 can be designed to attenuate microprocessor power dissipation while operating said on-die logic circuit 150 by disconnecting power supplied to a core of the microprocessor 135. Disconnecting power supplied to a core of the microprocessor 135 is typically accomplished by switching states of a transistor on-board or within the microprocessor-operated device package, a manner well known to those of skill in the art. In the present embodiment of the invention, the memory latency and the microprocessor latency, the entry latency and exit latency required to reduce core leakage power, can be significant design considerations. The memory latency refers to the amount of time that the snooping function cannot be performed due to switching the microprocessor operating states such as the amount of time to switch between the bypass clock signal and the clock signal. The entry latency is the amount of time required for the embodiment to place the microprocessor in a low power dissipation state. The exit latency is the amount of time required to return the microprocessor to a high power dissipation state. The present entry latency comprises the time required for transitioning the clock signal to a bypass clock signal of the bypass clock circuit 110 and disconnecting power supplied to a core of the microprocessor 135. Transitioning the clock signal to a bypass clock signal of the bypass clock circuit 110 comprises transitioning from a phase locked loop generated signal to a delay locked loop generated signal and the entry latency is less than 10 microseconds. The exit latency can comprise the time required for reconnecting the core power supply and transitioning the bypass clock signal to the clock signal. In this case, the exit latency is less than 500 microseconds, so the core leakage power can be reduced without significant disruption to the operation of the microprocessor.

Referring now to FIGS. 1*a* and *d*, a detailed flow chart for operating said on-die logic circuit 150 for this example embodiment is shown. In addition to the small microprocessor latency, the entry latency and exit latency, and a memory latency of a few bus clock cycles, operating said on-die logic circuit 150 can comprise providing power to the on-die logic circuit electrically separated from power supplied to the core 155, monitoring snoop requests 160, and snooping memory 165. In this embodiment, providing power to the on-die logic circuit electrically separated from power supplied to the core 155 allows manipulation of the power to the microprocessor core without substantially limiting the functionality of the on-die logic circuit. Monitoring snoop requests 160 comprises monitoring a bus to determine when snooping memory 165 is necessary. Then, snooping memory 165 completes the required snooping operations. For example, a snoop request for a second cache, a level two cache in this embodiment, may be placed on the bus. The on-die logic circuit, by monitoring snoop requests 160, determines snooping memory 165 is necessary and snoops the level two cache at the bypass clock frequency. However, while transitioning the clock signal to a bypass clock signal of the bypass clock circuit 110 and transitioning the bypass clock signal to the clock signal, monitoring snoop requests 160 and snooping memory 165 is not be performed.

In further embodiments, the context of the core of the microprocessor, i.e. the state of transistors that define the state of the microprocessor, can be stored in a context memory such as self suspend random access memory (SSRAM) on the on-die logic circuit or the second cache. Some embodiments incorporate this feature since design specific considerations may prefer returning the microprocessor to a high power dissipation state without resetting the microprocessor's context. Several of these embodiments also download the contents of level one cache to memory in level two cache since the level two cache will be maintained when disconnecting power supplied to a core of the microprocessor 135, in a manner well known to those of skill in the art.

In still further embodiments of the invention, providing a clock signal to an on-die logic circuit of a microprocessor 100 comprises reducing a clock signal generated by a phase locked loop to a minimum bus ratio. This is to reduce the power consumption of the remaining logic.

Referring now to FIGS. 2*a* and *b*, an alternative embodiment to reduce microprocessor power dissipation is shown. This embodiment of the invention is designed to adapt to a specific microprocessor-operated device and the conditions under which it operates. This embodiment, for example, is well suited for use in many microprocessor operated devices such as a notebook, or laptop, computer and adapts to typical software applications in use. This embodiment comprises providing a clock signal to an on-die logic circuit of a microprocessor 200, storing context of the microprocessor in a context memory 220, copying a value in a memory cell in a first cache to a memory cell in a second cache 240, reducing power supplied to a core of the microprocessor 260, and operating said on-die logic circuit 280. Providing a clock signal to an on-die logic circuit of a microprocessor 200, in the present embodiment, comprises providing a clock signal via a bypass clock circuit 205, driving the bypass clock circuit with an external bus clock 210, and transitioning the bypass clock signal to the clock signal 215. Driving the bypass clock circuit with an external bus clock 210 sets the bypass clock signal to a ratio of the external bus clock. Setting the bypass clock signal may require additional circuitry to maintain the bypass clock in phase with the clock signal. For example, a first delay locked loop circuitry can track the phase of the clock signal and a second delay locked loop circuitry can be adjusted to a ratio of the external bus clock while remaining in phase with the clock signal. Such designs are implementation specific and allow smooth frequency transitions. Transitioning the bypass clock signal to the clock signal 215 can require similar frequency transition considerations to return the microprocessor to its high power dissipation state. For example, embodiments of the invention can be designed for transitioning the bypass clock signal to the clock signal 215 when a certain input is received by the microprocessor, such as an interrupt, a reset signal, a signal from an Advanced Programmable Interrupt Controller (APIC), or any other designated signal. In the present embodiment, an signal from the APIC, indicating a microprocessor function is required that cannot be serviced by the on-die logic circuit, initiates transitioning the bypass clock signal to the clock signal 215.

Referring still to FIG. 2a, storing context of the microprocessor in a context memory 220 and copying a value in a memory cell in a first cache to a memory cell in a second cache 240 can allow the microprocessor to return to it's current operating state, i.e. the current context of the microprocessor. When the voltage to the microprocessor is reduced significantly, the context of the microprocessor may be lost since transistors within the microprocessor cannot remain in their respective states at such a low voltage. In addition, the first cache, such as a level one cache, can operate on the same power supply as the core of the microprocessor so the low voltage can have a similar effect on the contents of the first cache. Further, if the core stops functioning at the reduced voltage or when power is disconnected from the core, the core can no longer maintain the coherency between the first cache and the second cache, such as between level one cache and level two cache. Thus, the microprocessor may reset to default settings and flush the first cache after reducing power supplied to a core of the microprocessor 260, in a manner well known to those of skill in the art. The present embodiment, however, is designed to return the microprocessor to its current operating state via the contents of the context memory and of the second cache.

Referring now to FIGS. 2a–c, a detailed flow chart for reducing power supplied to a core of the microprocessor 260 for this example embodiment is shown. Reducing power supplied to a core of the microprocessor 260 can be designed for changing the microprocessor operating state to a low power dissipation state 265 and returning the microprocessor operating state to a high power dissipation state 270. By changing the microprocessor operating state to a low power dissipation state 265, the core leakage power can be reduced. Then when a signal is received such as an interrupt, a reset signal, a signal from an Advanced Programmable Interrupt Controller (APIC), or any other designated signal, indicating a microprocessor function is required that cannot be serviced by the on-die logic circuit, returning the microprocessor operating state to a high power dissipation state 270 is initiated. The signal can be the same signal that can be used for transitioning the bypass clock signal to the clock signal 215 so a designspecific sequence may be desirable. For the present embodiment, transitioning the bypass clock signal to the clock signal 215 occurs first, stalling the function of the on die logic circuit occurs second and returning the microprocessor operating state to a high power dissipation state 270 occurs last.

Referring to FIGS. 2a–d, a detailed flow chart for operating said on-die logic circuit 280 for this example embodiment is provided. Operating said on-die logic circuit 280 can comprise providing power to the on-die logic circuit electrically separated from power supplied to the core 285, monitoring snoop requests 290, and snooping memory 295.

In this embodiment, providing power to the on-die logic circuit electrically separated from power supplied to the core 285 can allow changing the microprocessor operating state to a low power dissipation state 265 with only a small latency affecting the functionality of the on-die logic circuit. Monitoring snoop requests 290 comprises monitoring a bus to determine when snooping memory 295 is desirable. Then, snooping memory 295 performs the snooping operations. For example, a snoop request can be received from the bus and the on-die logic circuit can respond by snooping the second cache.

In some alternative embodiments, the present invention comprises bypassing a clock signal via a phase locked loop circuit, in manners well known to those of ordinary skill in the art. Still further embodiments comprise maintaining the clock signal without generating a bypass clock signal. However, in many embodiments, maintaining the phase locked loop of the clock signal when reducing power supplied to a core of the microprocessor 260 can place the microprocessor in a higher power dissipation state than when providing a bypass clock signal. Several alternative embodiments, comprise methods of providing a clock signal via a bypass clock circuit 205, including different frequency levels for the bypass clock as a ratio of the bus frequency. Some embodiments of the present invention are also designed to select between more than one low power dissipation states based on typical operation parameters, software selections, or a hardware configuration. Further, these embodiments can comprise defaulting to a setting for a bypass clock signal and for a low power dissipation state.

Referring to FIG. 3, an embodiment for an apparatus to reduce microprocessor power dissipation is shown. In this embodiment of the invention, a microprocessor 300 comprises a core 350, an on-die logic circuit 340, a bus 310, a clock circuit 320, and a first cache 360. The core 350 comprises a core logic circuit 357 having the context of the microprocessor 300 and can perform the main functions of the microprocessor 300. The core 350 can be coupled to a power supply 390 and the on-die logic circuit 340 can be separately coupled to a power supply 390 by isolated paths for power or by having a switch or transistor at a branch of a first path to the core 350 and a second path to the on-die logic circuit 340. For example, the on-die logic circuit 340 may be supplied power by a connection for power independent of a connection for power to the core, such as from power supplied to level two cache or from a pin designated as a separate power supply for the on-die logic circuit 340. The on-die logic circuit 340 at the context memory 345 is coupled to the core 350 having the context of the microprocessor 300. The context memory 345 can comprise approximately one kilobyte SSRAM designed to hold the context of the microprocessor 300 and 300 bytes of shadow random access memory to store a micro-code patch such that the context of the microprocessor 300 is maintained without increasing the latency involved with switching microprocessor operating states. The core logic circuit 357, in the present embodiment, is coupled to the power supply 390 at an electrically separate core power supply 395 such that the electrically separate core power supply 395 coupling to the core logic circuit 357 can be disconnected without disrupting the power supply 390. The power supply 390 is coupled to the on-die logic circuit 340 to supply power. This makes it possible for the on-die logic circuit 340 to operate independent of a connection for power to the core 350. In addition, the core logic circuit 357 is coupled to the clock circuit 320 to supply a clock signal. The clock signal determines the speed of the core logic circuit 357 when the core logic circuit is powered. Further, the core logic circuit 357 is coupled to a first cache 360.

Referring again to FIG. 3, this embodiment of the invention comprises the first cache 360 which can be designed to store data, reducing the latency of data access, for the core logic circuit 357, in a manner well known to those of skill in the art. The first cache 360 is coupled to a second cache 370 and can be designed to download the contents of the first cache 360 into the second cache 370 to protect the contents from being corrupted. For example, the core logic circuit 357 can be designed to disconnect from the electrically separate core power supply 395 without disrupting the power supply 390 coupled to the on-die logic circuit 340. A transistor on-board the package or within the microprocessor-operated device may be used to disconnect the core logic circuit 357 from the electrically separate core power supply 395 by switching the transistor to a different operating state, in a manner well known to those of skill in the art.

The on-die logic circuit 340, as in the present embodiment, can be coupled to the bus 310. Requirements to snoop memory, such as the second cache 370, are placed on the bus 310 and the on-die logic circuit 340 can be designed to monitor the bus 310. When a snoop request is made, the on-die logic circuit 340 is designed to service that request by snooping memory, such as level two cache.

Referring still to FIG. 3, the bypass clock circuit 380, in the present embodiment of the invention, is coupled to the clock circuit 320 at the phase locked loop 325. In this embodiment, a default setting for a one to one bus ratio is provided. The bypass clock circuit 380 generates a bypass clock signal with a first delay locked loop. A second delay locked loop is coupled to the phase locked loop 325 to maintain the bypass clock signal of the first delay locked loop in phase with the clock signal generated by the phase locked loop 325. Frequency transitions have lower latency when the bypass clock circuit 380 is designed to maintain the first delay locked loop in phase with the phase locked loop 325.

Further embodiments of the present invention comprise a bypass clock circuit on the die of the microprocessor 300. Still other embodiments of the invention do not comprise a bypass clock circuit. In some of such embodiments, the clock circuit 320 can be coupled to the on-die logic circuit 340 to provide a snooping clock signal.

Referring to FIG. 4, an alternative embodiment for an apparatus to reduce microprocessor power dissipation is shown. In this embodiment of the invention, a microprocessor 400 comprises a core 440, an on-die logic circuit 430, a bypass clock circuit 410, a clock circuit 420, a first cache 450, and a second cache 460. The core 440 is coupled to the second cache 460 at a context memory 465. In the present embodiment, the context memory 465 comprises two kilobytes of self suspend random access memory to store the context of the microprocessor 400. The core 440 is also coupled to the power supply 490 at an electrically separate core power supply 495 such that the core 440 can be disconnected from the electrically separate core power supply 495 without disrupting the power supply 490. A disruption in the power supply 490 may affect the proper function of the on-die logic circuit 430, so the core 440 can be coupled to a power supply 490 and the on-die logic circuit 430 can be separately coupled to a power supply 490 by isolated paths for power, such as this embodiment, or by having a switch or transistor at a branch of a first path to the core 440 and a second path to the on-die logic circuit 430. This makes it possible for the on-die logic circuit 430 to operate independent of a connection for power to the core 440. For example, the on-die logic circuit 430 may be supplied power by a connection for power independent of a connection for power to the core, such as from power supplied to level two cache or from a pin designated as a separate power supply for the on-die logic circuit 430. In addition, the core 440 is coupled to the clock circuit 420 such that a clock signal from the clock circuit 420 can be used to operate the core 440, in a manner well known to those of ordinary skill in the art. Further, the core 440 is coupled to a first cache 450. A first cache 450 coupled to the core 440 is typically designed to improve performance of the microprocessor 400 by allowing the microprocessor 400 a low latency access to data.

Referring again to FIG. 4, in the present embodiment of the invention, the first cache 450 is coupled to a second cache 460 to facilitate copying a value in a memory cell in the first cache 450 to a memory cell in the second cache 460. By copying the value, the present embodiment of the invention can invalidate and flush the first cache 450 upon returning the microprocessor 400 to a high power dissipation state.

The on-die logic circuit 430, as in the present embodiment, can be coupled to the bus 475. The bus 475 can contain a snoop request when snooping memory is necessary. The on-die logic circuit 430 waits for a snoop request and initiates snooping memory when a snoop request is made. The on-die logic circuit 430 is also coupled to an external memory 470 and the second cache 460 so that both the external memory 470 and the second cache 460 can be snooped. A snoop request for external memory 470, DRAM, may be placed on the bus, for example. The on-die logic circuit 430, designed to handle the snoop request comprises an external bus logic (EBL) and a backside bus logic (BBL). The EBL is capable of reading the snoop request, a snoop request monitor, and snooping the DRAM via a memory controller hub (MCH), a snooping memory circuit. On the other hand, if the snoop request is made for the second cache 460, level two cache, the EBL is designed to read the snoop request, a snoop request monitor, and cause the BBL to perform the snooping of the level two cache so BBL performs the function of the snooping memory circuit. The BBL is designed to perform snooping operations on the level two cache. The clock signal provided to the on-die logic circuit 430 is a design specific consideration that can affect the operation of the on-die logic circuit 430. In the present embodiment, the on-die logic circuit 430 is coupled to the bypass clock circuit 410. The bypass clock circuit 410 is designed to offer a bypass clock signal to the EBL sufficient to snoop DRAM when the bypass clock is operated at a minimum bus ratio.

Referring still to FIG. 4, the bypass clock circuit 410, in the present embodiment of the invention is coupled to the clock circuit 420. The bypass clock circuit 410 can be designed to select between several bypass clock signals or to maintain the clock signal. In this embodiment, the bypass clock circuit is coupled to an external bus clock 480 and comprises a default setting for a one to one bus ratio of the external bus clock 480. The bypass clock circuit 410 can generate a bypass clock signal for the on-die logic circuit 430. Further, the bypass clock circuit 410 is coupled to the clock circuit 420 to maintain the bypass clock signal in a phase relationship with the clock signal generated by the clock circuit 420. A phase relationship can facilitate transitions in the microprocessor's 400 operating states, as is well known to those of ordinary skill in the art.

Further embodiments of the present invention comprise a bypass clock circuit separate from the die of the microprocessor 400. Still other embodiments of the invention do not comprise a bypass clock circuit. In some of such embodiments, the clock circuit 420 can be coupled to the on-die logic circuit 430 to provide a snooping clock signal.

In some embodiments, the present invention comprises a first delay locked loop circuit that locks to a ratio of a bus clock frequency. In addition, a second delay locked loop maintains the bypass clock signal of the first delay locked loop in phase with the phase locked loop clock signal for the core. In this way, the first delay locked loop clock signal can be maintained in that phase when the phase locked loop is powered off. When the phase locked loop is powered on, the phase between the first delay locked loop and the phase locked loop is maintained by the second delay locked loop so transition from the bypass clock signal to the clock signal can be performed with a small latency. Some embodiments can further comprise a default setting for a bypass clock signal and for a low power dissipation state.

What is claimed is:

1. A method, comprising:
   providing a clock signal to an on-die logic circuit of a microprocessor;
   reducing power supplied to a core of the microprocessor;
   operating said on-die logic circuit, the on-die logic circuit receiving power separate from power supplied to the core; and
   the on-die logic circuit monitoring snoop requests and snooping memory.

2. The method of claim 1, further comprising storing context of the microprocessor in a context memory.

3. The method of claim 2, further comprising copying a value in a memory cell in a first cache to a memory cell in a second cache.

4. The method of claim 1, wherein said providing a clock signal to an on-die logic circuit of a microprocessor comprises providing a clock signal via a bypass clock circuit.

5. The method of claim 1, wherein said providing a clock signal to an on-die logic circuit of a microprocessor comprises:
   transitioning the clock signal to a bypass clock signal of the bypass clock circuit; and
   transitioning the bypass clock signal to the clock signal.

6. The method of claim 5, wherein said providing a clock signal to an on-die logic circuit of a microprocessor comprises driving the on-die logic circuit with an external bus clock.

7. The method of claim 1, wherein reducing power supplied to a core of the microprocessor comprises:
   changing the microprocessor operating state to a low power dissipation state; and
   returning the microprocessor operating state to a high power dissipation state.

8. The method of claim 1, wherein reducing power supplied to a core of the microprocessor comprises disconnecting power supplied to a core of the microprocessor.

9. A microprocessor, comprising:
   a clock circuit;
   a core coupled to said clock circuit; and
   an on-die logic circuit coupled to said clock circuit to operate independent of a connection for power to said core, the on-die logic circuit includes a snoop request monitor coupled to a bus, and a snooping memory circuit.

10. The microprocessor of claim 9, further comprising a bypass clock circuit coupled to said clock circuit and to said on-die logic circuit.

11. The microprocessor of claim 10, further comprising an external bus clock coupled to said clock circuit and to said bypass clock circuit.

12. The microprocessor of claim 9, further comprising an external memory coupled to said on-die logic circuit.

13. The microprocessor of claim 9, further comprising:
   a first cache coupled to said core; and
   a second cache coupled to said first cache and to said on-die logic circuit.

14. The microprocessor of claim 9, wherein said clock circuit comprises a phase locked loop circuit coupled to the external bus clock and to said core.

15. The microprocessor of claim 9, wherein said core comprises a core logic circuit coupled to said clock circuit and coupled to an electrically separate core power supply.

16. The microprocessor of claim 9, wherein said bypass clock circuit comprises a frequency doubler coupled to said on-die logic circuit.

17. A system, comprising:
   a microprocessor comprising:
      a clock circuit;
      a core coupled to the clock circuit;
      a first cache; and
      an on-die logic circuit coupled to the clock circuit to operate independent of a connection for power to said core;
   a context memory coupled to the core;
   a second cache coupled to the first cache; and
   a power supply coupled to the core and separately coupled to the on-die logic circuit;
   the on-die logic circuit includes a snoop request monitor coupled to a bus, and a snooping memory circuit.

18. The system of claim 17, further comprising a bypass clock circuit coupled to the clock circuit and coupled to the on-die logic circuit.

19. The system of claim 18, further comprising an external bus clock coupled to the clock circuit and to the bypass clock circuit.

20. The system of claim 19, wherein the clock circuit comprises a phase locked loop circuit coupled to the external bus clock and to the core.

21. The system of claim 20, wherein the core comprises:
   a core logic circuit coupled to the phase locked loop circuit and coupled to the electrically separate core power supply.

22. The system of claim 18, wherein the bypass clock circuit comprises a frequency doubler coupled to the on-die logic circuit.

23. The system of claim 17, further comprising an external memory coupled to the on-die logic circuit.

* * * * *